(12) United States Patent
Collet et al.

(10) Patent No.: US 7,424,515 B2
(45) Date of Patent: Sep. 9, 2008

(54) SYSTEM AND METHOD FOR DEFERRING THE DELIVERY OF AN E-MAIL

(75) Inventors: Jean-Luc Collet, La Gaude (FR); Francois-Xavier Drouet, Nice (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 10/980,357

(22) Filed: Nov. 3, 2004

(65) Prior Publication Data

US 2005/0108343 A1  May 19, 2005

(30) Foreign Application Priority Data

Nov. 14, 2003  (EP) ................................. 03368098

(51) Int. Cl.
*G06F 15/16* (2006.01)
(52) U.S. Cl. .................. 709/206; 709/207; 709/230; 709/238
(58) Field of Classification Search .................. 709/206
See application file for complete search history.

(56) References Cited

U.S. PATENT DOCUMENTS

| 6,418,478 | B1 | 7/2002 | Ignatius et al. | |
|---|---|---|---|---|
| 6,542,972 | B2 | 4/2003 | Ignatius et al. | |
| 6,760,752 | B1* | 7/2004 | Liu et al. | 709/206 |
| 7,035,880 | B1 | 4/2006 | Crescenti et al. | |
| 7,130,970 | B2 | 10/2006 | Devassy et al. | |
| 7,174,433 | B2 | 2/2007 | Kottomtharayil et al. | |
| 7,209,972 | B1 | 4/2007 | Ignatius et al. | |
| 2001/0034769 | A1* | 10/2001 | Rast | 709/206 |
| 2005/0033756 | A1 | 2/2005 | Kottomtharayil et al. | |
| 2005/0044114 | A1 | 2/2005 | Kottomthatayil et al. | |
| 2005/0120106 | A1* | 6/2005 | Albertao | 709/223 |
| 2005/0257082 | A1 | 11/2005 | Ignatius et al. | |
| 2005/0268068 | A1 | 12/2005 | Ignatius et al. | |
| 2006/0021066 | A1* | 1/2006 | Clayton et al. | 726/28 |
| 2006/0155810 | A1* | 7/2006 | Butcher | 709/206 |

FOREIGN PATENT DOCUMENTS

| JP | 09258870 A | * | 10/1997 |
|---|---|---|---|
| JP | 2000105732 A | * | 4/2000 |
| JP | 2001223734 A | * | 8/2001 |
| JP | 2003141039 A | * | 5/2003 |

\* cited by examiner

*Primary Examiner*—Walter Lindsay, Jr.
*Assistant Examiner*—Abdulfattah Mustapha
(74) *Attorney, Agent, or Firm*—Norman L. Gundel; Hoffman Warnick LLC

(57) ABSTRACT

System for deferring the delivery of an e-mail sent by a sender to a receiver through a data transmission network such as Internet wherein a Message Transfer Agent (MTA) associated with the sender is in charge of transmitting over the network any e-mail being sent by the sender. The system comprises a retention server for storing the e-mail whose delivery is to be deferred and an authorization server for giving the retention server the authorization to deliver the stored deferred e-mail to the receiver when predetermined criteria are met. The MTA associated with the sender includes a retention enabling program for sending the deferred e-mail to the retention server when there is an indication in the e-mail that it is to be deferred.

12 Claims, 3 Drawing Sheets

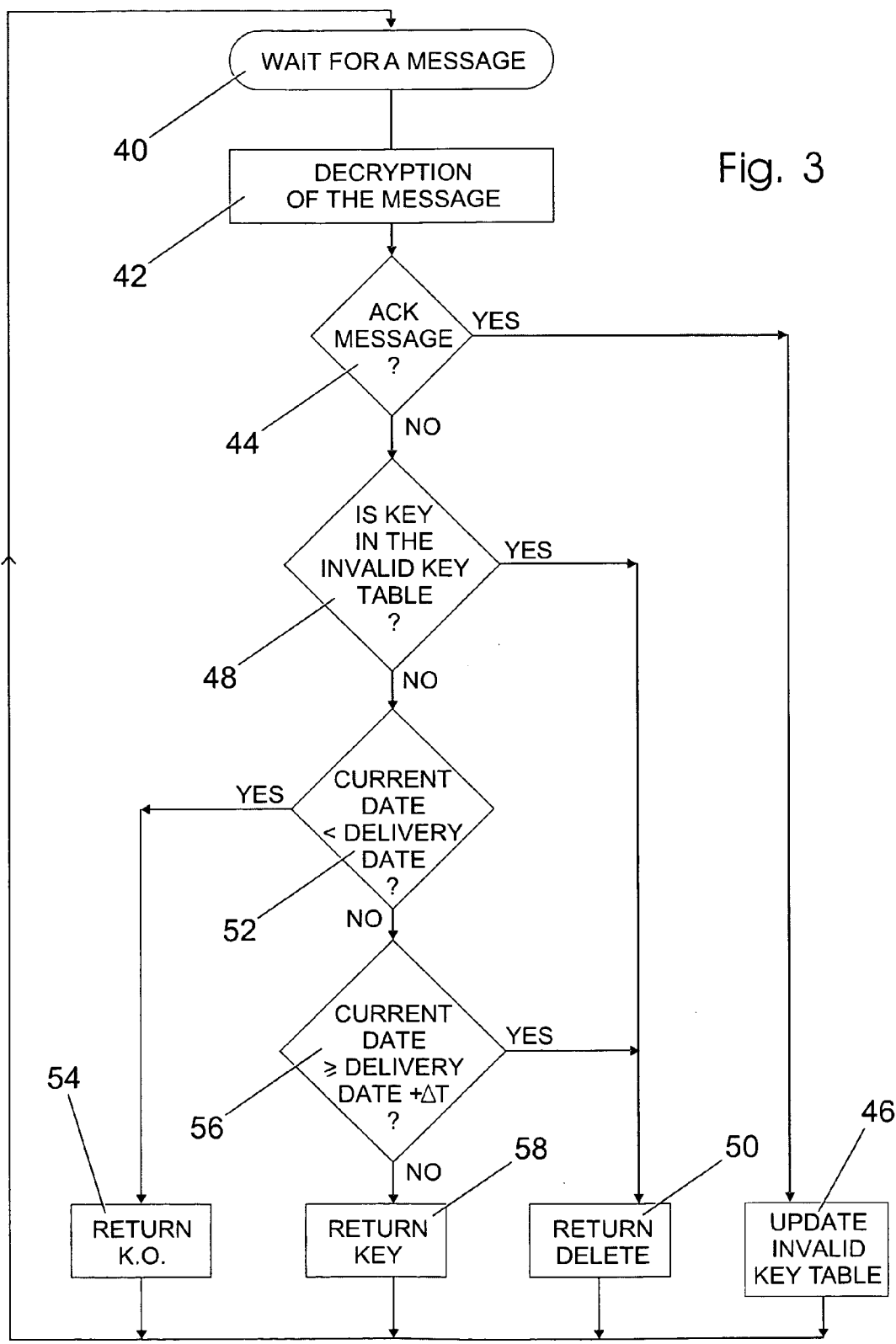

SYSTEM AND METHOD FOR DEFERRING THE DELIVERY OF AN E-MAIL

TECHNICAL FIELD

The invention relates to the processing of an e-mail from a sender mailbox to a receiver mailbox through servers which can take some criteria associated with the e-mail into consideration, and in particular relates to a system and a method for deferring the delivery of an e-mail.

BACKGROUND OF THE INVENTION

Today, the use of e-mails sent through a data transmission network such as Internet is widespread. When the sender of an e-mail sends an e-mail to a recipient, the action is immediate and, unless a problem is encountered between the servers of the sender and recipient, the e-mail is delivered in the recipient's mailbox without any control by the sender of when it should be delivered.

This is a problem if the sender wants to send information to a receiver but wants the information to be delivered only after a given date or after some predetermined criteria are met, and wants the contents and destination of the e-mail to remain confidential. Such a situation can occur, for example, if the sender wants to provide information to someone only after his death or provide some advantages to someone only after a predefined date.

Japanese patent application 2001-223734 describes a system wherein the transmission of an e-mail by a sender is delayed and the e-mail is kept in a sender Message Transfer Agent (MTA) during a delay period. However, such a system wherein the e-mail is kept by the sender does not allow the confidentiality of both sender and receiver to be maintained. Furthermore, there is no possibility of destroying the e-mail if the sender decides not to send it.

SUMMARY OF THE INVENTION

Accordingly, the present invention provides a system and method for enabling an e-mail to be delivered only when predetermined criteria are met, and wherein no one, except the sender, is aware of the e-mail destination. The e-mail is kept in a retention server which obtains the destination of the e-mail only after the predetermined criteria have been met.

The present invention also provides a system and method for enabling an e-mail to be delivered only when predetermined criteria are met, and wherein the authorization to deliver the e-mail is given by a trusted authorization server different from the retention server where the e-mail is kept, thereby preventing the e-mail from being read by a hacker accessing the retention server.

The invention therefore relates to a system for deferring the delivery of an e-mail sent by a sender to a receiver through a data transmission network such as Internet wherein a Message Transfer Agent (MTA) associated with the sender is in charge of transmitting over the network any e-mail being sent by the sender. This system comprises a retention server for storing an e-mail whose delivery is to be deferred, and an authorization server adapted to give the retention server the authorization to deliver the stored e-mail to the receiver when predetermined criteria are met. The MTA associated with the sender includes a retention enabling program for sending an e-mail to the retention server when there is an indication in the e-mail that it is to be deferred.

According to another aspect, the invention relates to a method for deferring the delivery of an e-mail in such a system comprising the steps of sending an e-mail whose delivery is to be deferred from the MTA to a retention server, storing the deferred e-mail in the retention server, and authorizing by an authorization server the retention server to deliver the stored deferred e-mail to the receiver when predetermined criteria are met.

BRIEF DESCRIPTION OF THE DRAWINGS

The above and other objects, features and advantages of the invention will be better understood by reading the following more particular description of the invention in conjunction with the accompanying drawings wherein:

FIG. 3 is a flow chart of the deferment steps performed in the authorization server.

DETAILED DESCRIPTION OF THE INVENTION

Figure 1:
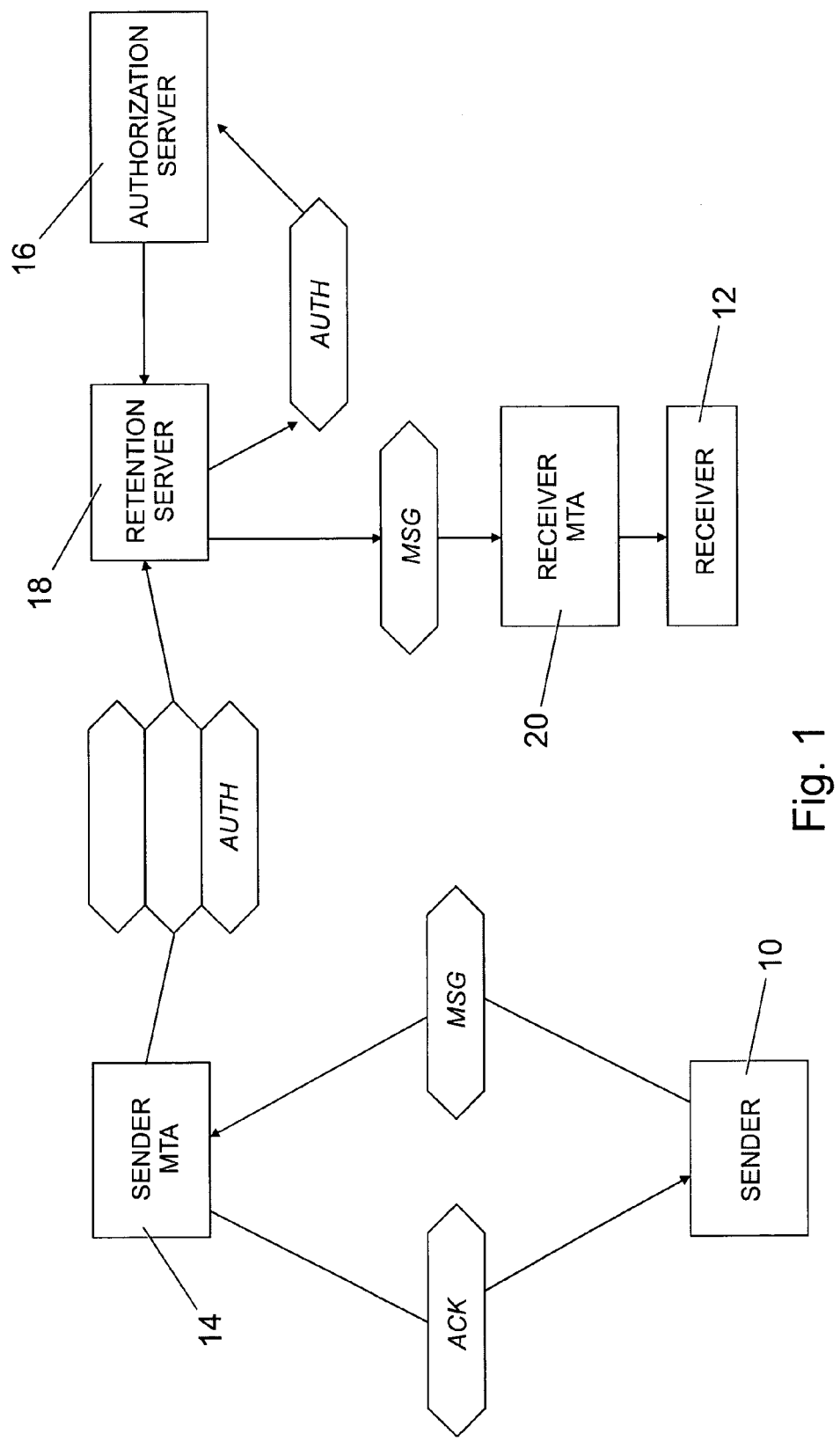
FIG. 1 is a block-diagram representing a system according to the invention and the various messages which are exchanged between the elements of the system in order to defer the delivery of an email.

It is assumed that a sender 10 illustrated in FIG. 1 wishes to send an e-mail message to a receiver 12 through a data transmission network such as Internet, and that the sender also wants the delivery of the e-mail message be deferred until a predefined delivery date.

Although it is not compulsory, the text of the e-mail message is generally encrypted by using a public key of the receiver. After the encryption, the email message "MSG" is provided to the Message Transfer Agent (MTA) 14 of the sender 10. The email message MSG, including its e-mail header, is comprised as follows:

To: Receiver identification
From: Sender identification
Subject: Deferred mail
Delivery: DD/MM//YYYY
ENCRYPTED TEXT When the email message MSG is received by the sender MTA 14, the sender MTA 14 checks the e-mail message MSG for the presence of "Deferred mail" using a retention enabling program. Since the email message MSG is to be deferred, the retention enabling program generates a random key X and uses it to encrypt the original e-mail message MSG (which is preferably encrypted with the receiver public key as mentioned above). After encryption, the e-mail message MSG becomes ENCRYPTED MSG. Note that the random key X is a unique key and can be generated, for example, by using the current time.

As described below, the system includes an authorization server 16 which owns a public key and private key couple. The public key of the authorization server 16 is then used to encrypt a piece of data including the random key X and the target delivery date in order to obtain a message authorization AUTH.

A new e-mail is sent from the sender MTA 14 to a retention server 18. This e-mail is comprised as follows:

MAIL HEADER
ENCRYPTED MSG
AUTH

Wherein MAIL HEADER is comprised as follows:

To: Retention server identification
From: Confidential

Subject: Deferred mail
Delivery date: DD/MM/YYYY
AUTH: Authorization server identification.

At the same time, this e-mail is sent to the retention server 18, and an acknowledgment ACK e-mail is sent back from the sender MTA 14 to the mailbox of the user 10. The ACK e-mail includes a piece of data including the invalidation of the random key X and the delivery date, and contains the identification of the authorization server 16 as destination address in its header. As for the original e-mail, the piece of data relating to the invalidation of the random key X is preferably encrypted using the public key of the authorization server 16. As described below, the ACK e-mail enables the deferred e-mail to be deleted by the sender at any time.

The retention server 18 periodically checks whether the current date matches any of the delivery dates it has under its control. Assuming that the current date corresponds to the delivery date of the subject e-mail, the retention server 18 sends the message AUTH (containing the random key X and the delivery date) to the authorization server 16. As already mentioned, the message is preferably encrypted with the public key of the authorization server 16 and only this server can decrypt it by using its private key.

Once the AUTH message has been decrypted, the authorization server 16 can check whether the delivery date corresponds to the current date. If so, the authorization server 16 extracts the random key X and sends it back to the retention server 18. It must be noted that the checking of whether the delivery date corresponds to the current date is necessary even though such a checking has already been made by the retention server 18. Indeed, only the authorization server 16 is a trusted server whereas the retention server 18, which could be the receiver MTA, or even the sender MTA, is not trusted and could be hacked.

On receipt of the random key X, the retention server 18 can use it to decrypt the original e-mail MSG. This decryption gives access to the receiver address and therefore, the e-mail MSG can be sent to the receiver MTA 20 which delivers it in the mailbox of the receiver 12.

Figure 2:
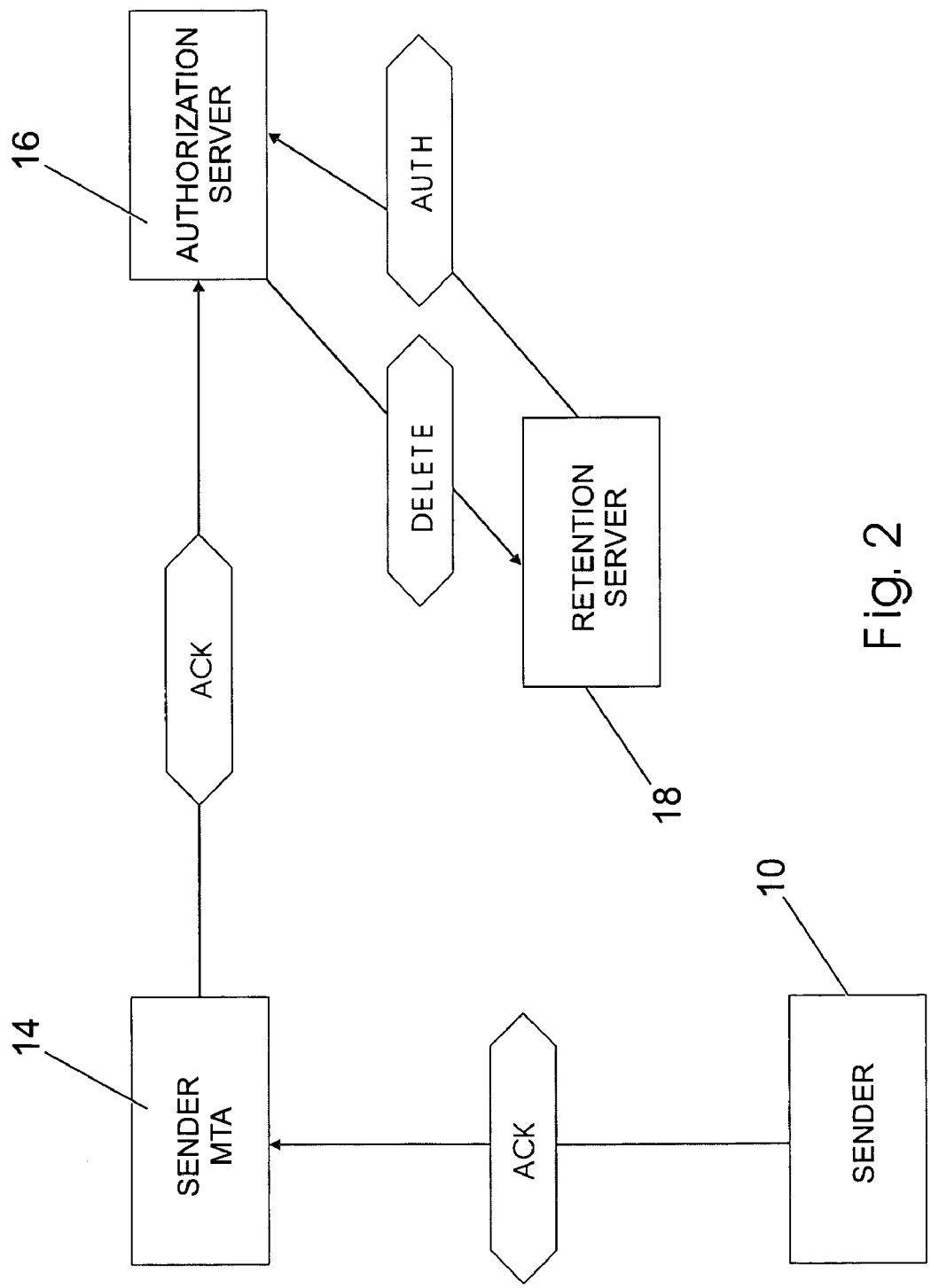
FIG. 2 is a block diagram representing the elements of the system according to the invention which are involved in the invalidation of a deferred e-mail and the messages exchanged between those system elements.

Before the delivery date defined in the original e-mail, it is possible for the sender 10 to delete the previously deferred e-mail. As illustrated in FIG. 2, the sender 10 sends an e-mail, which is the ACK message as defined above. This e-mail is forwarded by the sender MTA 14 to the authorization server 16 since it contains the identification of this server as a destination address in its header.

It should be remembered that the ACK message contains data relating to the invalidation of the random key X. When received by the authorization server 16, the authorization server 16 decrypts the message with its private key if it has been encrypted with the public key of the authorization server 16. The random key X which has been decrypted is then stored in an invalid key table. Later on, when the retention server 18 sends a message AUTH to the authorization server 16 in order to decrypt the random key X as described above, the authorization server 16 decrypts the random key X and checks whether this key is stored in the invalid key table. If it is the case, a delete message is returned to the retention server 18 causing the deletion of the original e-mail which becomes undecryptable.

As it is possible that the retention server 18 never sends the AUTH message in case where a hacker (who could be the receiver) prevents the message from being sent, it is necessary to limit the validity time of decryption of the deferred e-mail after the delivery time. When this validity time is reached, the authorization server 16 sends a delete message to the retention server 18 even though it has not received the AUTH message and removes the random key X from the invalid key table.

It must be noted that the system according to the invention is particularly useful for deferring the delivery of an e-mail taking a later date into account. However, it is possible to implement the invention using other criteria to be met for delivering the e-mail. In such a case, the authorization server 16 will provide the authorization to deliver the e-mail only when it has determined that these criteria have been met.

The processing steps achieved in the authorization server 16 are now described in reference to FIG. 3. First, the authorization server 16 waits for a message (step 40). When a message is received, it is decrypted using its private key (step 42). Then, the authorization server 16 checks whether decrypted received message is an ACK message (step 44). If so, the authorization server 16 updates the invalid key table by adding the new invalid key defined in the message (step 46).

When the message being received is not an ACK message, this means that it is an AUTH message sent by the retention server 18. In such a case, the authorization server 16 checks whether the involved key is in the invalid key table (step 48). If it is the case, the authorization server 16 returns a delete message to the retention server 18 (step 50). If not, the authorization server 16 checks whether the current date is less than the delivery date indicated in the message (step 52). If it is the case, a K.O. Message (i.e., a refusal to return the random key X) is sent to the retention server 18 (step 54). If the current date is greater than the delivery date, it is checked whether it is greater than the delivery date and the validity time ΔT (step 56). If it is the case, a delete message is returned to the retention server 18 as explained above (step 50). If not, the decrypted random key is returned to the retention server 18 (step 58).

The system and the method according to the invention as described above provides a security mechanism allowing a receiver to read an e-mail only after a delivery date or after some predetermined criteria are met without allowing anyone from becomming aware of the destination of a deferred e-mail. Such a mechanism is particularly appropriate when the sender wants to give advantages to a person only after his death or a predetermined date.

The invention claimed is:

1. System for deferring delivery of an e-mail sent by a sender to a receiver through a data transmission network, wherein a Message Transfer Agent (MTA) associated with the sender is in charge of transmitting over the network any e-mail being sent by the sender, the system comprising:
   a retention server for storing an e-mail whose delivery is to be deferred;
   an authorization server for giving the retention server authorization to deliver the stored e-mail to a receiver when predetermined criteria are met;
   the sender MTA including a retention enabling program for sending the deferred e-mail to the retention server when there is an indication in the e-mail that it is to be deferred, the retention enabling program generating a random and unique key and encrypting the deferred e-mail using the random and unique key before sending the deferred email to the retention server; and
   the sender MTA further sending a message (ACK), which includes data relating to an invalidation of the random and unique key, to the sender at the same time the sender MTA sends the deferred e-mail to the retention server;
   wherein the sender can cause the deferred e-mail stored in the retention server to be deleted by sending the ACK message back to the authorization server.

2. System according to claim 1, wherein the predetermined criteria comprises a delayed date of the deferred e-mail.

3. System according to claim 1, wherein, upon receipt of the ACK message, the authorization server decrypts the random and unique key using a private key and stores the decrypted random and unique key in an invalid key table.

4. System according to claim 3, wherein the data relating to the invalidation of the random and unique key of the deferred e-mail is encrypted using a public key of the authorization server before being sent to the retention server.

5. Method for deferring delivery of an e-mail sent by a sender to a receiver through a data transmission network, wherein a Message Transfer Agent (MTA) associated with the sender is in charge of transmitting over the network any e-mail being sent by the sender, the method comprising:

sending an e-mail whose delivery is to be deferred from the sender MTA to a retention server, the sender MTA encrypting the deferred email using a random and unique key before sending the deferred email to the retention server, the sender MTA further sending a message (ACK), which includes data relating to an invalidation of the random and unique key, to the sender at the same time the sender MTA sends the deferred e-mail to the retention server;

storing the deferred e-mail in the retention server, and authorizing by an authorization server the retention server to deliver the stored deferred e-mail to the receiver when predetermined criteria are met;

wherein the sender can cause the deferred e-mail stored in the retention server to be deleted by sending the ACK message back to the authorization server.

6. Method according to claim 5, wherein the predetermined criteria comprises a delayed delivery date of the deferred e-mail.

7. Method according to claim 6, wherein a message (AUTH), which includes the random and unique key and the delayed delivery date encrypted with a public key of the authorization server, is sent with the deferred e-mail from the sender MTA to the retention server.

8. Method according to claim 7, wherein the stored deferred e-mail is authorized to be delivered to the receiver when the authorization server receives the AUTH message from the retention server on the delivery date.

9. Method according to claim 8, wherein, upon receipt of the ACK message, the authorization server decrypts the random and unique key using a private key and stores the decrypted random and unique key in an invalid key table.

10. Method according to claim 9, further comprising checking whether the random and unique key included in the AUTH message received by the authorization server on the delivery date is in the invalid key table and deleting the deferred stored e-mail from the retention server if the random and unique key is in the invalid key table.

11. Method according to claim 10, wherein the stored deferred e-mail is deleted from the retention server a validity time after the delivery date.

12. Method according to claim 5, wherein the e-mail to be deferred is encrypted by the sender using a public key of the receiver.

* * * * *